Oct. 20, 1953          A. L. FLADUNG          2,656,191
                       PIPE NIPPLE CHUCK
                       Filed June 30, 1952
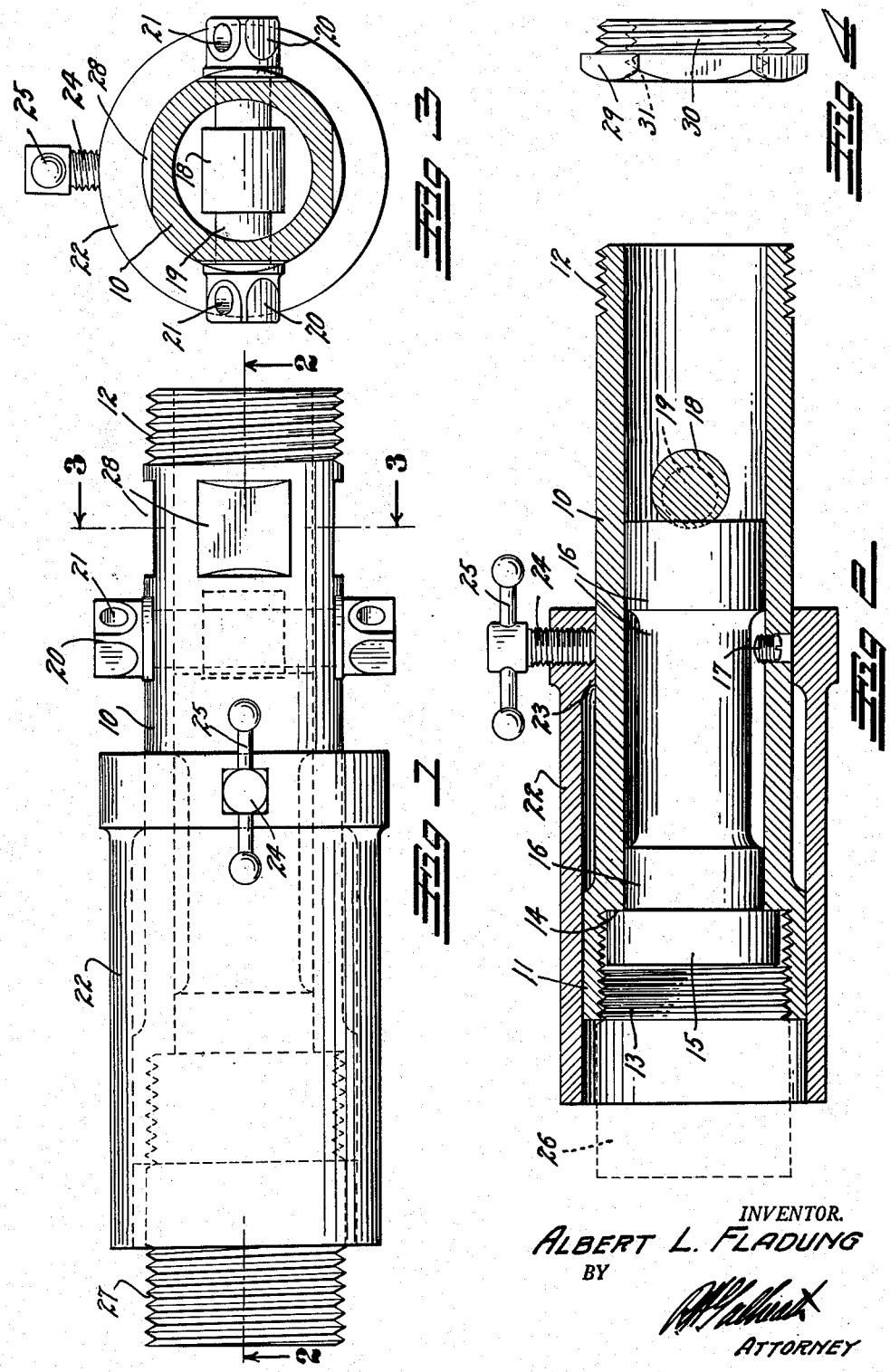
INVENTOR.
ALBERT L. FLADUNG
BY
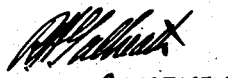
ATTORNEY Patented Oct. 20, 1953

2,656,191

UNITED STATES PATENT OFFICE 2,656,191

PIPE NIPPLE CHUCK

Albert L. Fladung, Westminster, Colo.

Application June 30, 1952, Serial No. 296,427

4 Claims. (Cl. 279—7)

This invention relates to a pipe nipple chuck, and has for its principal object the provision of means for supporting short pipe lengths to be threaded to form pipe nipples. With the usual pipe chuck, it is not possible to cut what are known as short and close nipples. This is due to the fact that conventional die stocks are provided with guide sleeves which rotate about the pipe to guide the threading dies thereon. It is therefore impossible in the usual chuck to cut and thread a nipple which is shorter than the guide sleeve on the die stock.

The principal object of this invention is to provide a device which will securely support a short nipple within the guide sleeve of the die stock so that the threading dies may reach and thread the nipple, regardless of the shortness of the latter.

Another object of the invention is to so construct the nipple chuck that it can be preset to thread nipples of any desired length and which can thread close nipples, that is, nipples in which the threads at the two extremities of the nipple contact each other.

A further object is to provide a nipple chuck for cutting close and short nipples which can be mounted in the usual pipe-threading machines, or which can be held in either a conventional pipe vise or a standard machinist's vise.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of the improved nipple chuck;

Fig. 2 is a longitudinal section therethrough, taken on the line 2—2, Fig. 1;

Fig. 3 is a cross-section therethrough, taken on the line 3—3, Fig. 1; and

Fig. 4 is a side view of an adapter bushing which may be used with the improved chuck.

The improved nipple chuck comprises a tubular barrel 10 having an enlarged, cylindrical cup 11 formed on its forward extremity and preferably provided with threads 12 at its rearward extremity and with flat wrench or vise-engaging flat faces 28. The cup 11 is of larger diameter than the barrel 10 and is provided with internal threads 13 of the proper diameter and pitch to fit the pipe threads of the largest pipe for which the particular chuck is designed.

The bottom of the cup 11 terminates in a shoulder 14 against which a clamping disc 15 rests. The clamping disc is formed on the forward extremity of an elongated plunger 16, which is slidably mounted within the barrel 10. The mid-portion of the plunger 16 is reduced in diameter, as illustrated, to reduce weight and to provide operating space for a limit screw 17 which is threaded through the wall of the barrel 10 into the cut-away portion of the plunger 16 to limit the amount of forward movement of the plunger.

The plunger 16 may be urged forwardly in the barrel 10 by means of an eccentric cam 18 formed or mounted on a transversely extending cam shaft 19. The cam shaft extends diametrically through and projects outwardly at both sides of the barrel 10. Both extremities of the cam shaft are formed with wrench-engaging heads 20, preferably provided with turning pin openings 21. It can be readily seen that rotation of the shaft 19 will cause the cam 18 to force the plunger and the clamping disc 15 forwardly in the barrel 10.

A tubular die stock guide sleeve 22 is slidably mounted on the barrel 10. The external diameter of the cup 11 corresponds to the internal diameter of the sleeve 22, and an inwardly extending annular boss 23 is formed on the inner extremity of the sleeve to slide upon the barrel 10. The sleeve 22 may be locked in any desired position on the barrel 10 by means of a suitable set screw 24 preferably having a reciprocating lever handle 25.

Let us assume it is desired to cut and thread a nipple of a diameter corresponding to the internal threads 13. The end of a piece of pipe is threaded, and the pipe is cut off to the desired nipple length. The threaded piece is screwed into the threads 13, as indicated in broken line at 26 in Fig. 2. The cam shaft 19 is rotated to force the plunger forwardly. This acts to clamp the clamping disc 15 against the threaded extremity of the pipe piece to securely lock it in the threads 13 so as to prevent rotation of the pipe piece in either direction. The sleeve 22 is then moved along the barrel 10 until the outer edge of the sleeve aligns with the inner limit of the threads to be formed on the nipple. The guide sleeve of a conventional die stock is then slipped over the die stock guide sleeve 22 until the dies engage and cut threads on the projecting extremity of the pipe piece 26 as indicated at 27 in Fig. 1.

To thread nipples of smaller diameter than the threads 13 reducing bushings are used. Such a bushing is illustrated in Fig. 4 and consists of a hexagonal head 29 with a projecting, externally threaded portion 30. The bushing is internally threaded as indicated in broken line at 31 to receive the pipe piece from which the nipple is to be formed. The threaded portion 30 is designed to thread into the threads 13 of the chuck with the hexagonal head 29 clamped against the rim of the cup 11 within the outer guide sleeve 22. A plurality of bushings are provided with each chuck. For instance, the threads 13 will be standard for 2" pipe and 2" bushings will be provided having internal threads 31 for 1½", 1", ¾" and ½" pipe.

The threads 12 on the barrel 10 are designed to fit the threads of the chuck holder of a conventional pipe threading machine if it is desired to use the chuck on such a machine. The extremity of the barrel, however, can be gripped in any suitable vise, where a pipe threading machine is not available; or the die stock may be held stationary and the chuck rotated by means of a suitable wrench engaging the flat faces 28.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A pipe nipple chuck for use with a die-stock comprising: a tubular barrel; a cup-shaped, internally-threaded socket formed on the outer extremity of said barrel to receive a piece of pipe; a die-stock guide sleeve slidably mounted on said barrel so that it may be projected outwardly beyond the outer extremity of said barrel to receive said die-stock; means carried by said guide sleeve and engaging said barrel to lock the former in any desired longitudinal position on the latter; a plunger slidably mounted in said tubular barrel; and means carried by said barrel and acting against said plunger to force the latter against the extremity of the piece of pipe in said cup-shaped socket.

2. A pipe nipple chuck as described in claim 1 having a clamping disc formed on said plunger within said socket and positioned between said plunger and said piece of pipe to contact the latter.

3. A pipe nipple chuck as described in claim 2 in which the means acting against said plunger comprises a diametrically extending cam shaft rotatably mounted in said barrel inwardly of said plunger, said cam shaft projecting outwardly from said barrel; an eccentric cam on said cam shaft within said barrel; and means for rotating said cam shaft from the exterior of said barrel to force said cam against the inner extremity of said plunger.

4. A pipe nipple chuck as described in claim 3 having threads formed on the inner extremity of said barrel for mounting the latter in a pipe threading machine and having wrench-engaging means formed on the projecting extremity of said cam shaft for rotating the latter.

ALBERT L. FLADUNG.

References Cited in the file of this patent

UNITED STATES PATENTS

| Number | Name | Date |
|---|---|---|
| 445,949 | Hacken | Feb. 3, 1891 |
| 1,772,953 | Lilleberg | Aug. 12, 1930 |
| 2,046,579 | Penick et al. | July 7, 1936 |
| 2,598,423 | Pealer | May 27, 1952 |